United States Patent
Howell

(10) Patent No.: US 7,806,820 B2
(45) Date of Patent: Oct. 5, 2010

(54) AUTOMATIC BALANCING DEVICE AND SYSTEM FOR CENTRIFUGE ROTORS

(76) Inventor: Gary Wayne Howell, 16449 Indian Mound Rd., Norwood, NC (US) 28128

( * ) Notice: Subject to any disclaimer, the term of this patent is extended or adjusted under 35 U.S.C. 154(b) by 825 days.

(21) Appl. No.: 11/743,360

(22) Filed: May 2, 2007

(65) Prior Publication Data
US 2008/0271786 A1    Nov. 6, 2008

(51) Int. Cl.
B04B 9/14 (2006.01)

(52) U.S. Cl. .................. 494/82; 494/83; 494/84

(58) Field of Classification Search ............ 494/1, 494/10, 12, 16, 20, 33, 82, 83, 84, 85; 73/457–458; 74/572.4; 68/23.1, 23.2; 210/85, 144
See application file for complete search history.

(56) References Cited

U.S. PATENT DOCUMENTS

| | | | |
|---|---|---|---|
| 3,606,143 A * | 9/1971 | Stallmann | 494/82 |
| 4,154,394 A | 5/1979 | Reed | |
| 4,412,707 A | 11/1983 | Buffet | |
| 4,417,884 A | 11/1983 | Schoendorfer et al. | |
| 4,565,937 A | 1/1986 | Uhen | |
| 5,026,341 A | 6/1991 | Giebeler | |
| 5,456,653 A | 10/1995 | Wright | |
| 5,551,941 A | 9/1996 | Howell | |
| 5,827,168 A * | 10/1998 | Howell | 494/7 |
| 5,851,170 A * | 12/1998 | Howell | 494/20 |
| 5,921,148 A * | 7/1999 | Howell | 74/572.4 |
| 6,354,988 B1 * | 3/2002 | Carson et al. | 494/82 |
| 6,440,055 B1 | 8/2002 | Meisberger | |
| 6,455,002 B1 | 9/2002 | Jokes et al. | |
| 6,579,217 B1 | 6/2003 | Buxton | |
| 6,586,255 B1 | 7/2003 | Hubert et al. | |
| 6,589,153 B2 | 7/2003 | Dolecek et al. | |
| 6,589,789 B1 | 7/2003 | Hubert et al. | |
| 6,599,482 B1 | 7/2003 | Dorin et al. | |
| 6,626,814 B1 | 9/2003 | Setterberg | |
| 6,635,007 B2 | 10/2003 | Evans, III et al. | |
| 6,638,203 B2 * | 10/2003 | Carson et al. | 494/82 |
| 6,679,820 B2 | 1/2004 | Barkus et al. | |
| 6,747,427 B1 | 6/2004 | Carson | |
| 6,806,604 B2 | 10/2004 | Werfel et al. | |
| 6,832,980 B2 | 12/2004 | Hayasaka | |
| 6,949,063 B2 | 9/2005 | Baik et al. | |
| 6,960,158 B2 * | 11/2005 | Mackel | 494/82 |

(Continued)

FOREIGN PATENT DOCUMENTS

GB       2146784 A * 4/1985

*Primary Examiner*—Charles E Cooley
(74) *Attorney, Agent, or Firm*—Schwartz Law Firm, P.C.

(57) ABSTRACT

An apparatus and method for automatic balancing and inertial damping of vibrations in a rotor are disclosed. According to one embodiment, a rotor drive shaft is adapted to mount a rotor and rotate the rotor. A lower drive shaft connects to a source of rotation. A flexible coupling attaches the rotor drive shaft to the lower drive shaft and transfers a rotational force applied by the source of rotation to the rotor while permitting relative lateral motion between the rotor drive shaft and the lower drive shaft. An inertial coupling is coupled to the rotor drive shaft and provides inertial resistance to the relative lateral motion. A clamping collar is coupled to the inertial coupling to couple the inertial coupling to a chassis and permit the relative lateral motion between the rotor drive shaft and the lower drive shaft.

28 Claims, 10 Drawing Sheets

U.S. PATENT DOCUMENTS

| | | |
|---|---|---|
| 6,985,828 B2 | 1/2006 | Itoh |
| 7,025,714 B2 | 4/2006 | Escal |
| 7,055,368 B2 | 6/2006 | Schneider et al. |
| 7,083,523 B2 | 8/2006 | Haile et al. |
| 7,115,090 B2 | 10/2006 | Lagarde |
| 2002/0086789 A1* | 7/2002 | Carson et al. ............. 494/82 |
| 2004/0142808 A1* | 7/2004 | Mackel ..................... 494/82 |
| 2008/0271786 A1* | 11/2008 | Howell |
| 2009/0023571 A1* | 1/2009 | Kusumoto et al. ............ 494/7 |

* cited by examiner

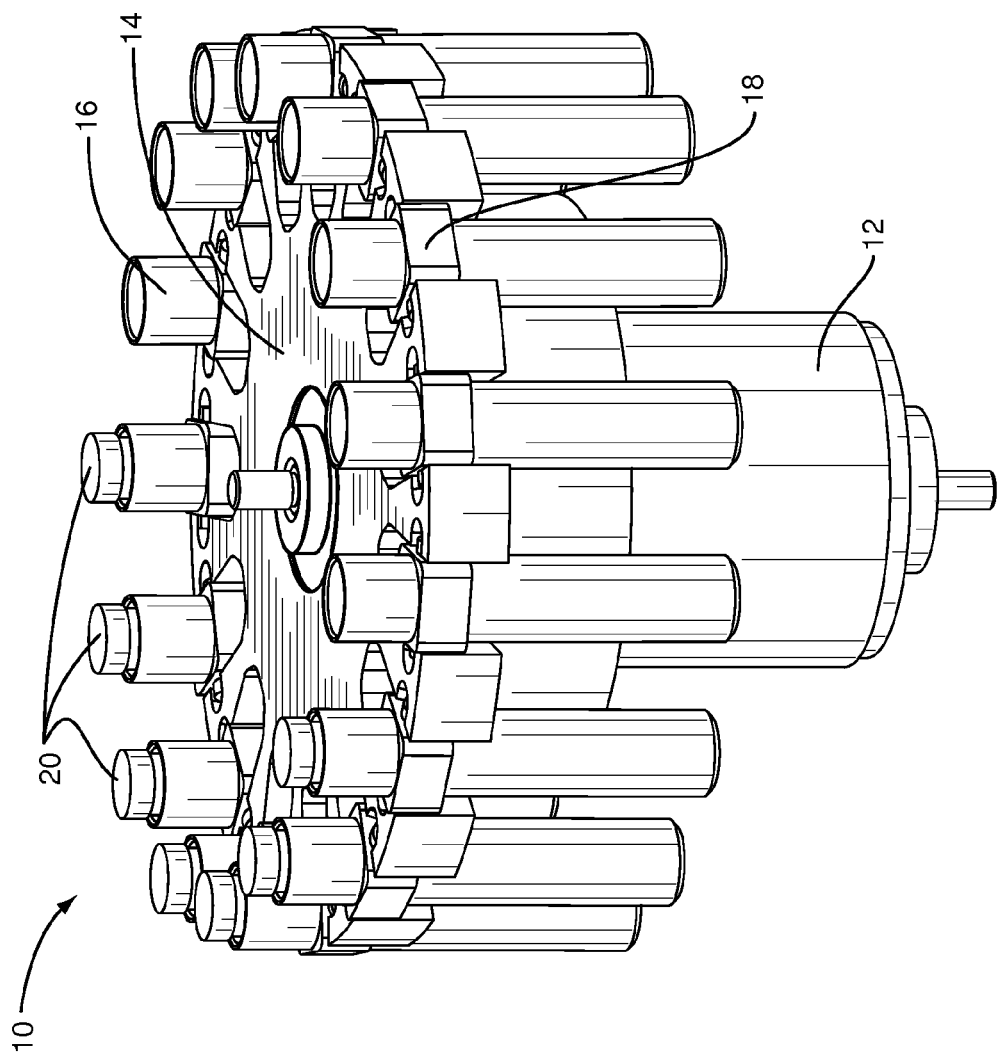

AUTOMATIC BALANCING DEVICE AND SYSTEM FOR CENTRIFUGE ROTORS

FIELD OF THE INVENTION

The present invention relates to an automatic balancing centrifuge that does not require load balancing of tubes placed in the centrifuge. More specifically, the present invention provides automatic critically-damped inertial mass centering of a centrifuge rotor to accommodate unbalanced loads without imparting significant vibration on the centrifuge chassis.

BACKGROUND OF THE INVENTION

A centrifugation device, often referred to as centrifuge, is used to separate laboratory specimen samples into component parts. For example, blood includes liquid, cells and other components. By spinning the specimen samples within the centrifuge at high velocity, such as 3,000 revolutions per minute (RPM), the samples are separated into the respective component parts based upon relative specific gravity of the components within the samples. When a sample includes components with differing specific gravities, the heavier components are forced to the bottom of the centrifuge tube when processed within the centrifuge. The separation of samples into component parts allows scientists and laboratory technicians to determine the relative quantities, through both qualitative and quantitative analysis, of the component parts within the samples, as well as providing an opportunity to further process the respective component parts.

A centrifugation device includes a rotor and a drive system that causes the rotor to rotate. The rotor is typically disk-shaped and intended to support specimen samples at its outer peripheral edge. The rotor possesses sufficient centripetal properties to retain the specimen samples against elevated gravitational forces generated when the rotor is rotated at high velocity.

With conventional centrifuge designs, the rotor support mechanism, excluding the drive motor (referred to herein as the gyro), can be little more than a bearing to support the rotor and a shaft connecting the rotor to the prime mover. If this rotor is sufficiently balanced, no apparent vibrational energy is translated to the support chassis as the rotor approaches operational speeds, referred to as "slew" speeds. However, in actual practice, there is at least some variation in specimen volume, and this mass differential alone can cause rotor imbalance to a greater or lesser extent. This rotor imbalance can cause significant vibration within a conventional centrifugation device.

To further explain the effect of an unbalanced centrifuge, FIG. 1 illustrates an exemplary trapezoidal velocity-time plot for a conventional centrifuge with time on the X-axis and velocity on the Y-axis. As can be seen from FIG. 1, the centrifuge rotor velocity appears as an ascending slope A with the angle dependent on acceleration rate after the centrifuge is activated. The plot then transitions to a flat line B as the rotor maintains constant velocity for a period of centrifugation time. The flat line B is referred to as the slew speed for the centrifugation process. The plot then has a descending slope C with the angle dependent on deceleration rate after the centrifuge is deactivated.

FIG. 1 also illustrates a phenomenon known as resonance. Resonance occurs within all rotational centrifugation devices as a result of forces which act upon the rotor as it speeds up and slows down. All rotors transition through resonance as they accelerate and likewise transition through resonance again as they decelerate.

As can be seen from FIG. 1, resonance occurs on the ascending slope A during acceleration and on the descending slope C during deceleration. Resonance is a function of the total rotational mass, any imbalanced mass, and the spring rate of the mechanical coupling (e.g., gyro) between the rotor and the chassis. Conventional rigid rotor/chassis couplings produce relatively high resonance speeds, typically occurring close to slew speeds.

In centrifuge rotors, energy is a function of the square of the velocity. As such, twice the velocity equals four times the energy. Accordingly, the high resonance speeds of conventional centrifugation devices produce significant accumulated energy at resonance and impart significant vibration to the chassis of the centrifuge.

Because of the high speeds and high accumulated energy at resonance, conventional centrifugation devices are particularly sensitive to unbalanced loading. An unbalanced load within a conventional centrifuge can result in significant imbalance of the forces at resonance. The additional forces caused by the unbalanced load at resonance can result in the rotor/gyro systems becoming violently unstable during resonance and cause them to physically crash into internal mechanical stops or exceed preset vibration limit switches, thus removing drive power.

FIGS. 2A-2C illustrate force vectors associated with centrifugation devices during an acceleration sequence. As can be seen from FIG. 2A, when counter-clockwise acceleration begins, a force vector D is in relative alignment with a motion vector E. The force vector D represents radial forces (e.g., stress) on the rotor and the motion vector E represents rotational movement (e.g., strain) of a centrifuge rotor. Throughout acceleration, the direction of the vectors changes continually and the motion vector E begins to lag behind the force vector D. This lag results from the fact that the force vector D is continually applied in a new direction throughout acceleration, which is ahead of the induced motion vector E. The angle quantifying the lag of the motion vector E behind the force vector D is termed phase angle. The phase angle is zero at zero RPM, approximately 90 degrees at resonance, and approximately 180 degrees at high speeds. The frequency of rotation divided by the resonant frequency is generally termed the frequency ratio. FIG. 2B shows that the motion vector E lags the force vector D by approximately 90 degrees at resonance. This 90 degree lag results in the violent instability of conventional centrifuge devices if loaded with an unbalanced load. FIG. 2C shows that the motion vector E lags the force vector D by approximately 180 degrees at slew speeds. When the vectors are at equal magnitude and opposite in direction, they effectively cancel one another and the centrifuge rotates smoothly without imparting vibration to the chassis. Any change in magnitude or phase angle may result in some vibration imparted to the chassis. Accordingly, as described above, if a conventional centrifuge is imbalanced, it may never reach slew speeds due to the high rotational energy accumulated by the time the rotor reaches resonance.

A previous solution has employed a flexible coupling between the prime mover and the rotor to allow lateral movement of the center of mass to automatically balance an unbalanced centrifuge. Frictional damping is used to limit lateral movement of the rotor. However, this causes vibration in the rotor and chassis of the centrifuge device, which is undesirable.

Accordingly, there exists a need to provide a device and system capable of automatically balancing centrifuge rotors that does not require load balancing of tubes placed in the centrifuge, and particularly for automatic critically-damped inertial mass centering of a centrifuge rotor to accommodate unbalanced loads without imparting significant vibration on the centrifuge chassis and without lateral frictional damping.

SUMMARY OF THE INVENTION

The present invention is a device and method for automatically balancing centrifuge rotors. More specifically, the present invention provides automatic critically-damped inertial mass centering of a centrifuge rotor to accommodate unbalanced loads without imparting significant vibration on the centrifuge chassis and without lateral frictional damping. A centrifuge rotor shaft is "softly coupled" to a motor drive shaft using a flexible coupling or bellows to allow the rotor to automatically adjust its spin axis from its center of geometry to its new rotational center of mass (e.g., mass centering) in the presence of an unbalanced load. However, the lateral motion needed to mass center the unbalanced load results in lateral energy within the rotor. This lateral motion can impart significant vibration to the centrifuge chassis as a result of overshoot and oscillations (e.g., an under-damped condition) during mass centering if it is not damped. Thus, the present invention also provides an inertial coupling mounted, via a bearing, on the rotor shaft between the rotor and the flexible bellows. This provides inertial critical damping of the mass centering action of the rotor and provides "virtual mass" to the rotor without increasing the polar moment of inertia (e.g., resistance to turning) of the rotor. The movable relatively high mass inertial coupling, in conjunction with the flexible bellows coupling, also enables a lower resonance speed for the centrifuge rotor, thus allowing the centrifuge rotor to transcend resonance with lower energy. As a result, the inertial coupling, and thus the rotational center or mass of the rotor, is free to move laterally without imparting significant vibration on the centrifuge chassis and without imparting vibration that prevents the velocity of the rotor from passing through resonance and reaching slew.

According to one embodiment of the present invention, the inertial coupling distributes its mass in close vertical proximity to the rotor and is attached via a bearing to the rotor shaft. This allows the inertial coupling to provide virtual mass to the rotor without turning at the same velocity and, thereby, without increasing the polar moment of inertia of the rotor. The inertial coupling is further attached via a clamping collar to a circular horizontal flange of the centrifuge chassis. Ball bearings are provided within bearing races in the inertial coupling and the clamping collar and are compressed against the circular horizontal flange by the clamping collar attachment to the inertial coupling. The ball bearings allow the inertial coupling to move horizontally with inertial resistance and to limit the effects of vertical force vectors and cantilevered moments. The clamping collar provides horizontal travel limiting to bound movement of the inertial coupling. An elastomeric cushion is also provided to soften the impact of the inertial coupling when it comes into contact with the chassis of the centrifuge. The elastomeric cushion absorbs energy during mass centering without imparting a rebound force to the inertial coupling and reduces vibration that may be imparted to the chassis of the centrifuge upon contact of the inertial coupling with the chassis. The elastomeric cushion may be made of a low-density open or closed cell foam of a monomer such as polyurethane.

According to another embodiment of the present invention, rotational frictional damping of the inertial coupling is provided by use of rods made of a low friction monomer, such as polytetrafluoroethylene (PTFE) or olefin. The rods are placed in contact with a surface of the inertial coupling to lightly inhibit rotation of the inertial coupling. The rods may be pressed against the inertial coupling, for example, using force provided by compressed springs. Alternatively, higher friction materials, such as polyurethane, may be used for tuning purposes where higher frictional damping may be required. Additionally, materials, such as high-density wool felt in conjunction with silicone oil and polyetheretherketone (PEEK), may also be used. Reliability of the centrifuge may be improved by decreasing excessive rotation of the inertial coupling using the rods.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 3 illustrates an exemplary embodiment of a centrifuge that does not require load balancing and that provides automatic critically-damped inertial mass centering to accommodate unbalanced loads without imparting significant vibration on a chassis, according to an embodiment of the subject matter described herein;

DETAILED DESCRIPTION OF THE PREFERRED EMBODIMENTS

Figure 1:
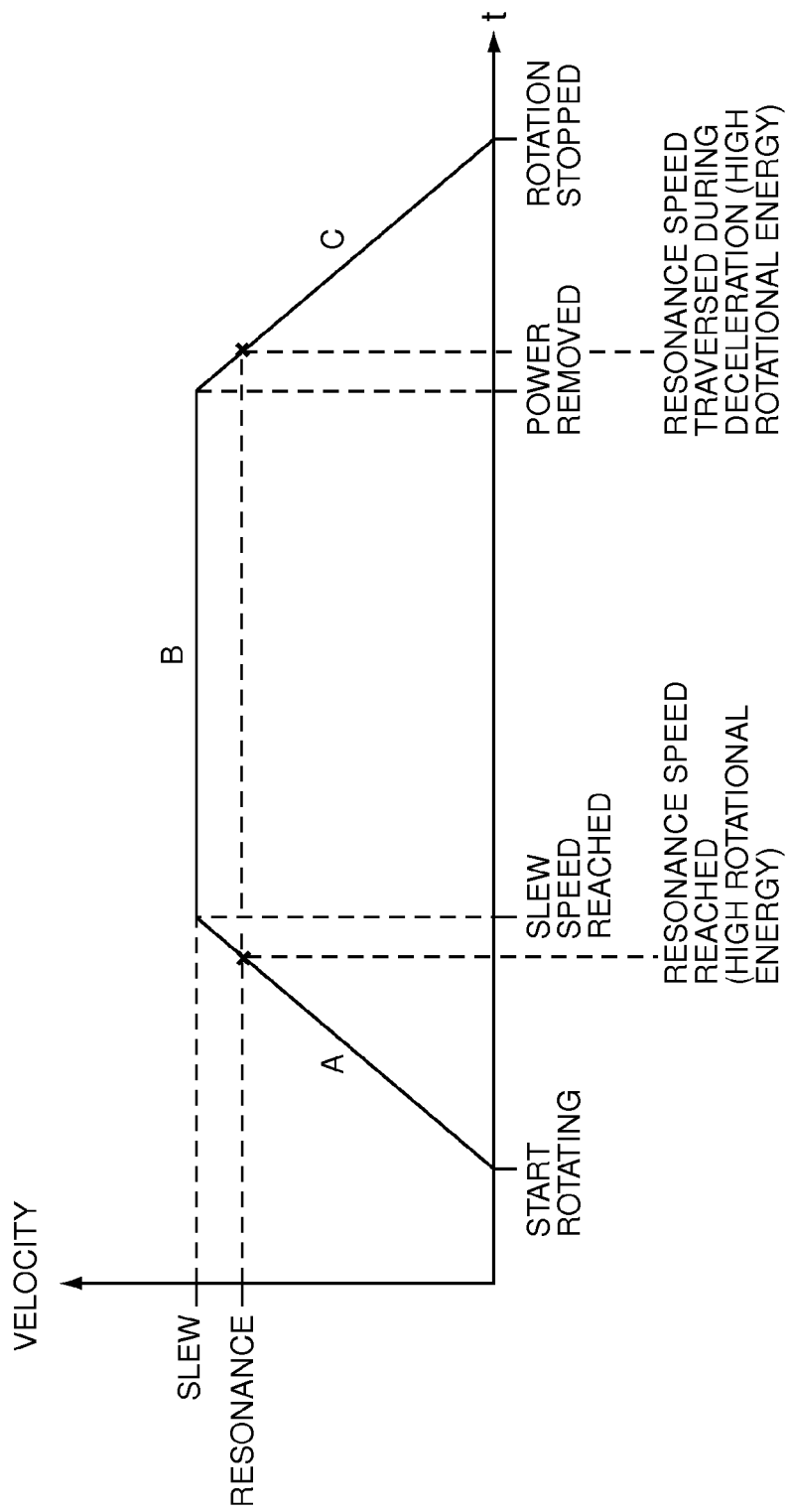
FIG. 1 illustrates an exemplary trapezoidal velocity-time plot for a conventional centrifuge with time on the X axis and velocity on the Y axis.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a device and method for automatically balancing centrifuge rotors. More specifically, the present invention provides automatic critically-damped inertial mass centering of a centrifuge rotor to accommodate unbalanced loads without imparting significant vibration on the centrifuge chassis. A centrifuge rotor shaft is "softly coupled" to a motor drive shaft using a flexible coupling or bellows to allow the rotor to automatically adjust its spin axis from its center of geometry to its new rotational center of mass (e.g., mass centering) in the presence of an unbalanced load. However, the lateral motion needed to mass center the unbalanced load results in lateral energy within the rotor. This lateral motion can impart significant vibration to the centrifuge chassis as a result of overshoot and oscillations (e.g., an under-damped condition) during mass centering if it is not damped. Thus, the present invention also provides an inertial coupling mounted, via a bearing, on the rotor shaft between the rotor and the flexible bellows. This provides inertial critical damping of the mass centering action of the rotor and provides "virtual mass" to the rotor without increasing the polar moment of inertia (e.g., resistance to turning) of the rotor. The movable relatively high mass inertial coupling, in conjunction with the flexible bellows coupling, also enables a lower resonance speed for the centrifuge rotor, thus allowing the centrifuge rotor to transcend resonance with lower energy. As a result, the inertial coupling, and thus the rotational center or mass of the rotor, is free to move laterally without imparting significant vibration on the centrifuge chassis and without imparting vibration that prevents the velocity of the rotor from passing through resonance and reaching skew.

FIG. 3 illustrates an embodiment of a centrifuge 10 that does not require load balancing and that provides automatic critically-damped inertial mass centering to accommodate unbalanced loads without imparting significant vibration on a chassis 12. Details related to the automatic critically-damped inertial mass centering will be described beginning with FIG. 4 below. In general, as illustrated in FIG. 3, a rotor 14 is illustrated with an exemplary fifteen buckets 16. The buckets 16 are secured to the rotor 14 by trunion mounts 18. The trunion mounts 18 allow the buckets 16 to pivot to a horizontal position when the rotor 14 spins at slew speeds. It should be noted that many other rotor styles exist and all are considered within the scope of the subject matter described herein. Furthermore, it is understood that the description herein may be applied to any field within which an unbalanced load may be rotated within a rotor without limitation.

Seven specimen tubes 20 are illustrated to be sequentially placed within seven of the buckets 16. By sequentially placing the seven specimen tubes 20 within seven of the fifteen buckets 16, an unbalanced rotor is provided to the centrifuge, for the example of the centrifuge as described herein. One skilled in the art will recognize that this presents a significantly imbalanced load to the centrifuge 10.

Figure 4:
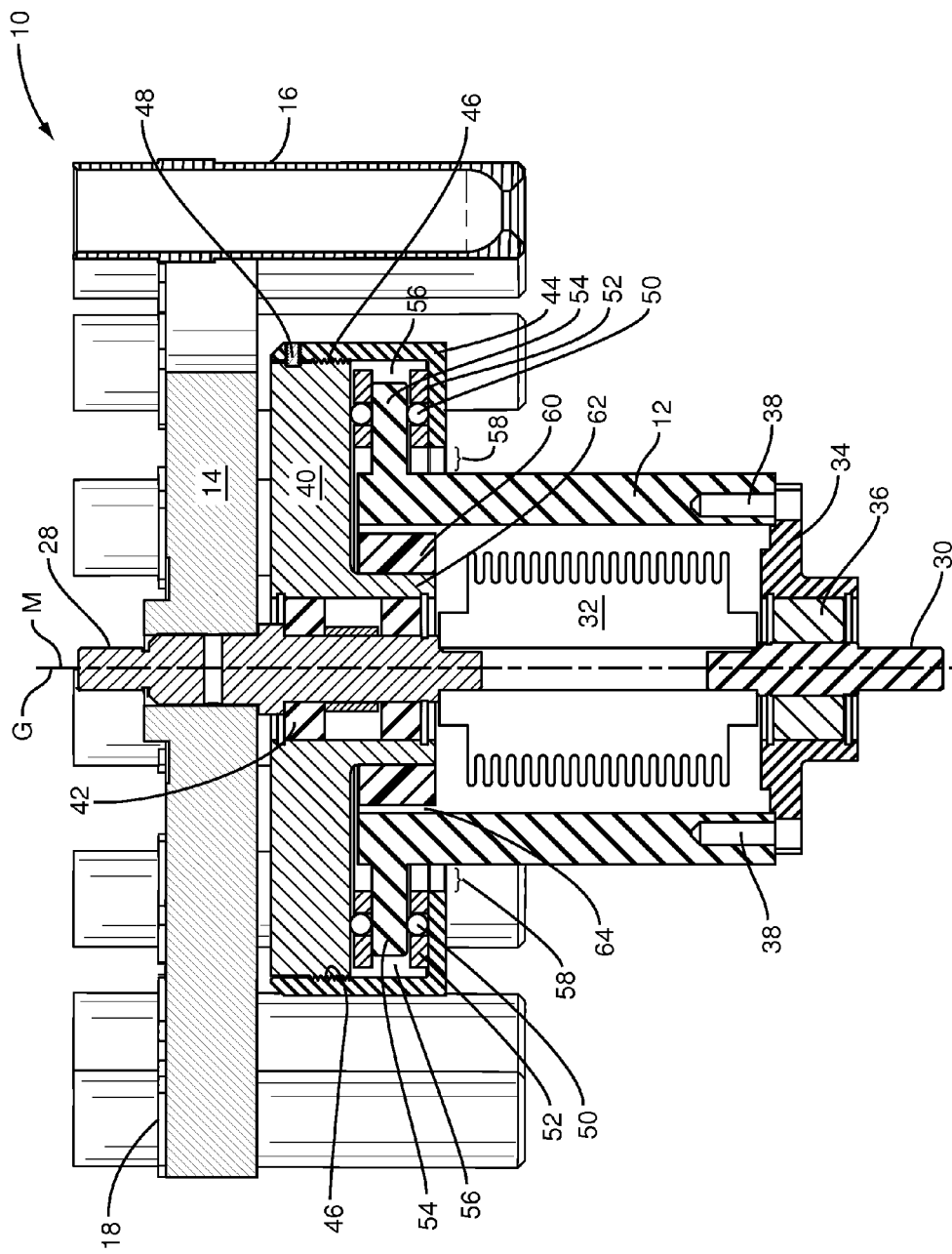
FIG. 4 illustrates an exemplary cross-sectional view of a centrifuge at rest and shows details related to the automatic critically-damped inertial mass centering capabilities of the centrifuge, according to an embodiment of the subject matter described herein.

FIG. 4 illustrates an exemplary cross-sectional view of the centrifuge 10 at rest and shows details related to the automatic critically-damped inertial mass centering capabilities of the centrifuge 10. As will be described in more detail below, the centrifuge 10 has a significantly lower resonance speed when compared to conventional centrifugation devices without a need for sensors, tolerance prone passive lateral frictional damping, or active damping members (e.g., solenoids). The centrifuge 10 also places additional "virtual" mass in very close vertical proximity to the rotor 14 without increasing the polar moment of inertia (e.g., resistance to turning) of the rotor 14. Furthermore, gyro reliability and manufacturing costs may be improved when compared to conventional centrifugation devices, thereby providing increased commercial opportunity for the centrifuge 10.

As can also be seen from FIG. 4, the centrifuge 10 is not yet spinning. As such, the fifteen buckets 16, as secured by the trunion mounts 18, are resting vertically on the trunion mounts 18 at approximately 90 degrees relative to horizontal. Characteristics of the centrifuge 10 during a centrifugation cycle with the rotor 14 spinning will be described below beginning with FIG. 6. One skilled in the art will realize that there are many different types of rotors and that the rotor 14 is but one possible variant. Accordingly, different resting angles for the buckets 16 are possible. Additionally, rotors exist which allow the buckets 16 to rotate to angles other than horizontal (e.g., 45 degrees relative to horizontal) during centrifugation. Furthermore, rotors exist that hold the sample tubes 20 at a fixed angle throughout centrifugation. All rotors are considered to be within the scope of the subject matter described herein.

A centrifuge rotor shaft 28 is "softly coupled" to a motor drive shaft 30 using a flexible bellows 32. Rotational force applied to the motor drive shaft 30 is transferred to the rotor shaft 28 via the flexible bellows 32. The flexible bellows 32 flexes during transfer of the rotational force from the motor drive shaft 30 to the rotor shaft 28. The soft coupling provided by the flexible bellows 32 allows the rotor 14 to automatically adjust its spin axis from its center of geometry to its new center of mass when torque is applied to "mass center" an unbalanced load. The flexible bellows 32 also provides the lower resonance speed for the centrifuge 10 due to the soft coupling between the rotor shaft 28 and the motor drive shaft 30. The flexible bellows 32 may be fastened to both the rotor shaft 28 and the motor drive shaft 30 via any device capable of securely fastening the flexible bellows 32 to both the rotor shaft 28 and the motor drive shaft 30, such as one or more set screws (not shown).

As will be described in more detail below in association with FIG. 7, the flexible bellows 32 is configured to offer flexibility for lateral displacement of the rotor 14 in the presence of an unbalanced load, while providing sufficient centering forces to move the rotor 14 back to the geometric center of the centrifuge 10 in a static mode (e.g., while not rotating).

A vertical axis/plane M represents the center of mass of the centrifuge 10 and a vertical axis/plane G represents the center of geometry of the rotor 14. As can be seen from FIG. 4, the vertical axis/plane M and the vertical axis/plane G approximately coincide when the rotor 14 is not spinning. It should be noted that, in addition to when the rotor 14 is not spinning, when the rotor 14 is spinning with a balanced load, the center of mass of the centrifuge 10 will also approximately coincide with the center of geometry of the rotor 14, represented by the vertical axis/plane M and the vertical axis/plane G, respectively. However, as will be described in more detail in association with FIGS. 5-7, during operation when an unbalanced load is placed within the rotor 14, the rotor 14 will mass shift when it begins to rotate, such that the center of mass of the unbalanced rotor 14 will align axially with the center of mass of the centrifuge 10 represented by the vertical axis/plane M, but the center of geometry of the rotor 14 represented by the vertical axis/plane G will shift to a different vertical alignment that will vary depending upon the imbalance of the load.

The motor drive shaft 30 couples to a chassis base 34 via a bearing 36. The bearing 36 may be any type of bearing, such as a ball bearing, that allows the motor drive shaft 30 to move freely relative to the chassis base 34 when a drive force from a motor (not shown) is applied to the motor drive shaft 30. The chassis base 34 is mounted to the chassis 12 via fasteners 38. The fasteners 38 may be any fastening device capable of securely mounting the chassis base 34 to the chassis 12, such as a bolt or bolt assembly.

An important aspect of the present invention is an inertial coupling 40 that is mounted, via a bearing 42, on the rotor shaft 28 between the rotor 14 and the flexible bellows 32. While the flexible bellows 32 provides the capability for the rotor 14 to mass center, the automatic inertial critical damping of the rotor 14 is provided by the mass of the inertial coupling 40.

As described above, the lateral motion needed to mass center an unbalanced load within the rotor 14 results in lateral energy within the rotor 14. This lateral motion can impart significant vibration to the centrifuge chassis 12 as a result of overshoot and oscillations (e.g., an under-damped condition) during mass centering if it is not damped.

The mass of the inertial coupling 40 provides inertial resistance to lateral motion of the rotor 14 and damps the lateral motion. However, as will be described in more detail below, the inertial coupling 40 does not rotate at the rate of the rotor 14. As such, the inertial coupling 40 provides inertial critical damping of the lateral mass centering action of the rotor 14 and provides its mass as a "virtual mass" to the rotor 14 without increasing the polar moment of inertia (e.g., resistance to turning) of the rotor 14. By imparting virtual mass to the rotor 14 without increasing the polar moment of inertia, the rotor 14 may have less mass than conventional rotors. A rotor 14 having less mass requires less energy to start and is consequently less dangerous, because less rotational energy is present within the rotor 14 at resonance and slew speeds.

The inertial resistance to lateral motion provided by the inertial coupling 40 in conjunction with the soft coupling provided by the flexible bellows 32 allows the inertial coupling 40 to move laterally without imparting significant vibration to the centrifuge chassis 12 and without imparting vibration that prevents the velocity of the rotor 14 from passing through resonance to reach slew speeds. It should be noted that no frictional lateral damping is provided within the centrifuge 10.

Figure 9:
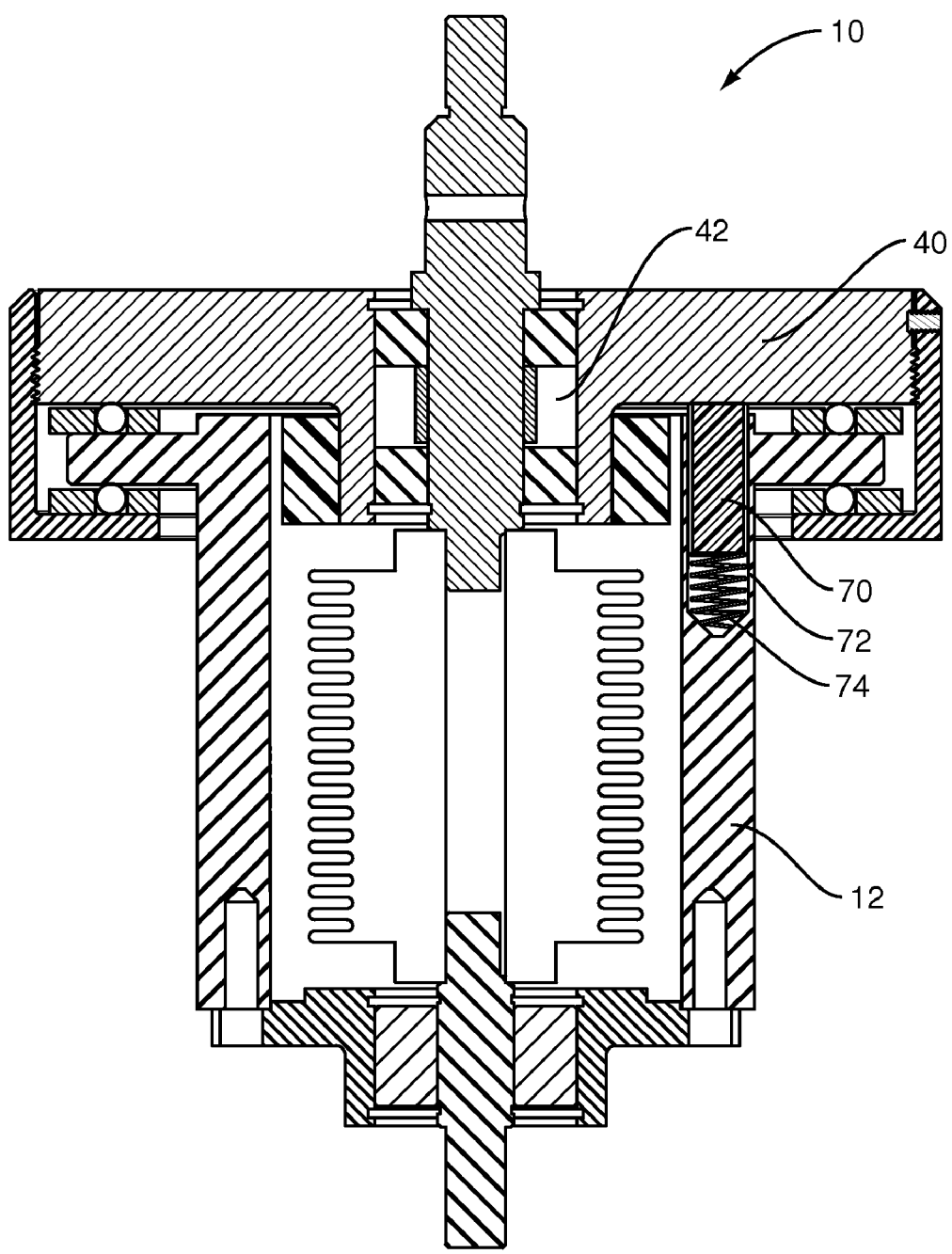
FIG. 9 illustrates an alternate embodiment of a centrifuge which includes frictional rotational damping, according to an embodiment of the subject matter described herein.

Because the inertial coupling 40 is mounted to the rotor shaft 28 via the bearing 42, the inertial coupling is not driven to turn at the rate of the rotor 14 and only turns incidentally due to friction within the bearing 42 and windage induced by the spinning rotor 14. An additional force known as harmonic drive also contributes to inertial coupling rotation, especially during significantly unbalanced rotor conditions. The rotation of the inertial coupling 40 may be on the order of 40-100 revolutions per minute (RPM), while the rotor 14 rotates at speeds of approximately 3,000 RPM. Rotational damping may be provided to further reduce any rotation that is imparted to the inertial coupling 40. FIG. 9 below describes an alternative embodiment that includes rotational frictional damping to limit rotation of the inertial coupling 40.

An exemplary mass ratio between the inertial coupling 40 and the rotor 14 is 1:1. By providing approximately equivalent mass between the inertial coupling 40 and the rotor 14, critical damping of the mass centering action of the rotor 14 may be achieved. Alternatively, mass ratios between the inertial coupling 40 to the rotor 14 are scalable and may be larger or smaller than 1:1 to tune the critical damping action of the inertial coupling 40. In one embodiment of the present invention, the mass of the inertial coupling 40 and the mass of the rotor 14 are approximately equal, or approximately 4.5 pounds in a particular example. In another embodiment, the mass of the inertial coupling 40 and the mass of the rotor 14 are approximately equal, or approximately 5 pounds in a particular example.

The inertial coupling 40 is configured and mounted to place its vertical center of gravity into very close physical proximity to the vertical center of gravity of the rotor 14. This minimizes the cantilevered moment between the rotor's 14 applied lateral forces and the inertial coupling 40, thereby imparting those forces more directly to the inertial coupling 40. In effect, the vertical center of gravity of the inertial coupling 40 and the vertical center of gravity of the rotor 14 approach the same vertical plane, which assists with the mass centering action of the rotor 14 and the critically-damped inertial action of the inertial coupling 40.

As previously described, resonance speed of a rotor, such as the rotor 14, is a function of total mass, exocentric mass, and coupling stiffness. As discussed above, the inertial coupling 40 effectively doubles the rotor's 14 total mass, but does not rotate at the rate of the rotor 14, thereby not increasing the rotor's 14 polar moment of inertia (e.g., resistance to turning). This effective mass increase of the rotor 14 without increased polar moment of inertia effectively lowers the resonance speed of the rotor 14 without penalizing acceleration/deceleration rate and without penalizing the total rotational kinetic energy of the rotor 14.

The inertial coupling 40 is also "softly" coupled to the chassis 12 by use of a clamping collar 44. The soft coupling of the inertial coupling 40 to the chassis 12 by use of the clamping collar 44 allows the inertial coupling 40 to move laterally with the rotor 14 during mass centering actions without imparting vibration to the chassis 12 and also helps to minimize the cantilevered moment between the rotor's 14 applied lateral forces and the inertial coupling 40.

The clamping collar 44 fastens to the inertial coupling 40 via threaded connectivity at locations 46 and is maintained at torque by three set screws 48 (one shown) that are spaced by 120 degrees around the circumference of the inertial coupling 40. It should be noted that any other number or arrangement of the set screws 48 may be used, such as six set screws 48 spaced by 60 degrees or any other combination, which provides a balanced fastening mechanism to maintain the torque between the inertial coupling 40 and the clamping collar 44 without providing horizontal rotational imbalance.

The soft coupling between the inertial coupling 40 and the clamping collar 44 to the chassis 12 is further accomplished by the use of ball bearings 50 within bearing races 52. When the clamping collar 44 is secured to the inertial coupling 40, the ball bearings 50 are compressed or pre-loaded against a circular flange 54 of the chassis 12. The ball bearings 50, operating under this pre-load compression, allow the inertial coupling 40 and rotor 14 to move laterally relative to the circular flange 54 during critically-damped inertial mass centering, while constraining vertical and angular forces that are generated by the spinning rotor 14. Constraining the vertical and angular forces minimizes the effect of these force vectors and any cantilevered moments generated relative to the lateral forces applied to the rotor 14, thereby imparting those forces more directly to the rotor 14. Additionally, by allowing the ball bearings 50 to roll when the inertial coupling 40 moves laterally, flat spots may be avoided on the ball bearings 50. An exemplary material from which the ball bearings 50 may be made is a plastic, such as Torlon (e.g., polyamide-imide).

It should be noted that the bearing races 52 are themselves circular and are located against the bottom and top surfaces of the inertial coupling 40 and the clamping collar 44, respectively. As such, when the inertial coupling 40 and the clamping collar 44 moderately rotate, as described above, the ball bearings 50 will be generally free to rotate within the bearing races 52 against the surfaces of the circular flange 54, the inertial coupling 40, and the clamping collar 44. However, during lateral motion of the inertial coupling 40 and the clamping collar 44, the ball bearings 50 will not rotate as freely due to friction at the sides of the bearing races 52. As such, the bearing races 52 in contact with the ball bearings 50 may provide additional damping of and resistance to lateral motion to further assist with the damping provided by the mass of the inertial coupling 40. Accordingly, the critically-damped inertial mass centering provided by the inertial coupling 40 may be assisted by frictional damping of the ball bearings 50 against the sides of the bearing races 52. Furthermore, this additional frictional damping may further reduce vibration as the rotor 14 passes through resonance, and may also be predictable and proportional to the lateral excursion, such that, in the presence of a higher lateral excursion, a higher frictional damping may be provided.

As can be seen from FIG. 4, spaces 56 are provided between an outer periphery of the circular flange 54 and an inner surface of the clamping collar 44. The spaces 56 provide lateral travel limiting for the inertial coupling 40 relative to the chassis 12. The clamping collar 44 has a circular cutout 58, which allows the clamping collar 44 to move laterally without coming into contact with the chassis 12. However, acting as hard stops to lateral movement, an impact of the clamping collar 44 against the circular flange 54 during a critically-damped inertial mass centering activity or due to an external impact may cause vibration to be imparted to the chassis 12. Additionally, if the chassis 12 is bumped or moved by external forces while rotating, the rotor 14 and inertial coupling 40 acting gyroscopically are moved against these otherwise internal hard stops. This may cause precipitous unacceptable vibration to the chassis 12.

As described above, with the rotor 14 spinning, at slew speeds in particular, the only force that constrains the inertial coupling 40 to the center of mass of the chassis 12 as depicted by the vertical axis/plane M is the relatively low spring force of the flexible bellows 32. As such, the mass centering action of the rotor 14 and the inertial coupling 40 may impart some vibration to the chassis 12, as described above. A circular elastomeric cushion 60 is attached to a circular vertical collar 62 of the inertial coupling 40 to compensate for and reduce any such vibration. The circular elastomeric cushion 60 absorbs contact energy as the inertial coupling 40 comes into contact with the inside surface of the chassis 12 without rebound and reduces any vibration that may be imparted to the chassis 12 upon impact.

Spaces 64 provide lateral travel limiting of the circular elastomeric cushion 60 relative to an inside surface of the chassis 12. As can be seen from FIG. 4, the travel limiting provided within spaces 64 is slightly smaller than the travel limiting provided within spaces 56. Accordingly, the circular elastomeric cushion 60 will come into contact with the inside surface of the chassis 12 and slightly compress before the inside of the clamping collar 44 comes into contact with the circular flange 54 of the chassis 12 within the spaces 56. The circular elastomeric cushion 60 may be made of a low durometer open or closed cell foam of a monomer, such as polyurethane. It should be noted that the circular elastomeric cushion 60 may be alternatively fastened to the inside surface of the chassis 12 without departure from the scope of the subject matter described herein.

Figure 5:
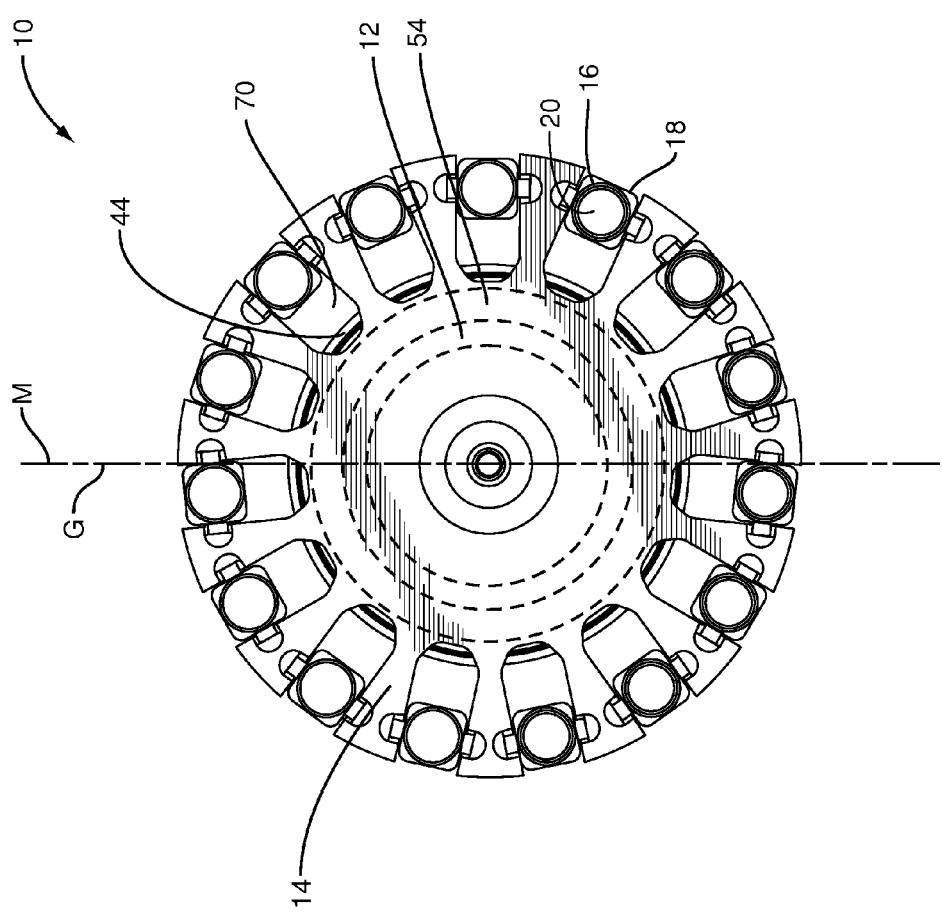
FIG. 5 illustrates an exemplary top view of a centrifuge at rest and loaded with seven sample tubes, according to an embodiment of the subject matter described herein.

FIG. 5 illustrates an exemplary top view of the centrifuge 10 at rest and loaded with seven sample tubes 20. As such, an unbalanced rotor 14 is provided to the centrifuge 10 for centrifugation. Furthermore, one skilled in the art will recognize that this presents a massively unbalanced load to the centrifuge 10. The clamping collar 44 can be seen through voids 70 in the rotor 14. The voids 70 allow the buckets 16 to rotate at the trunion mounts 18 to a horizontal plane during centrifugation. The chassis 12 and the circular flange 54 are illustrated in dashed lines. As can be seen from FIG. 5, the center of mass represented by the vertical axis/plane M is aligned with the center of geometry of the rotor 14, represented by the vertical axis/plane G.

Figure 6:
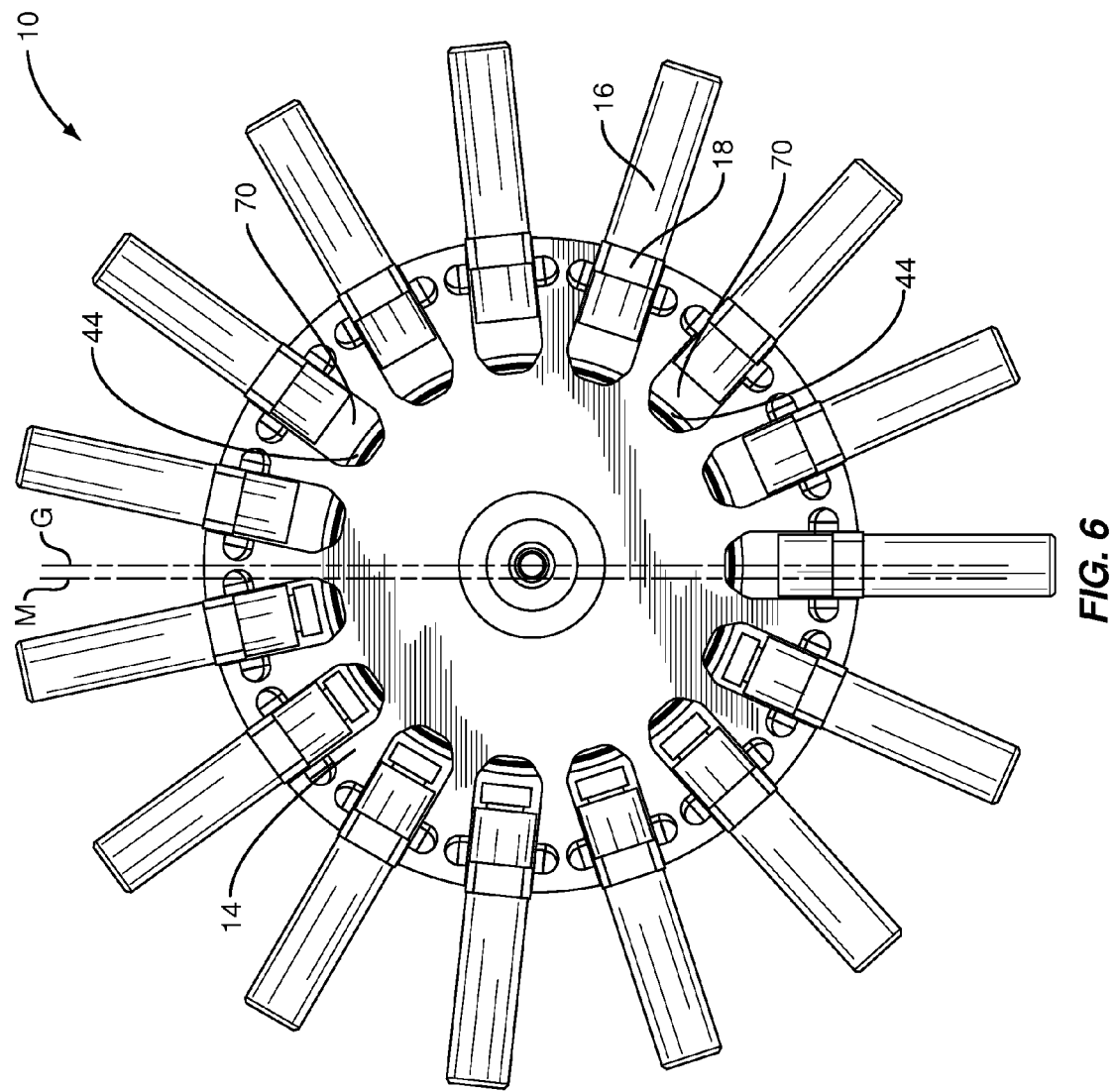
FIG. 6 illustrates an exemplary top view of a centrifuge while spinning at slew speeds and loaded with seven sample tubes to provide an unbalanced load, according to an embodiment of the subject matter described herein.

FIG. 6 illustrates an exemplary top view of the centrifuge 10 while spinning at slew speeds and loaded with seven sample tubes 20 to provide an unbalanced load. As can be seen from FIG. 6, the voids 70 have allowed the buckets 16 to rotate at the trunion mounts 18 to a horizontal plane during centrifugation. The rotor 14 has mass centered by moving to the right and a new center of mass has become the spin axis to offset the unbalanced load that has been presented by the seven sample tubes 20. As can be seen by the dashed line representations, the new center of mass of the rotor 14 is illustrated to be aligned with the center of mass of the centrifuge 10, represented by the vertical axis/plane M. However, as a result of the mass centering action, the center of geometry of the rotor 14, as represented by the vertical axis/plane G, has shifted to the right. The clamping collar 44 can be seen through the voids 70 in the rotor 14 to have moved with to the rotor 14 and is also aligned with the center of geometry of the rotor 14 on the vertical axis/plane G. More details of the mass centering action of the centrifuge 10 will be described below in association with FIG. 7.

Figure 7:
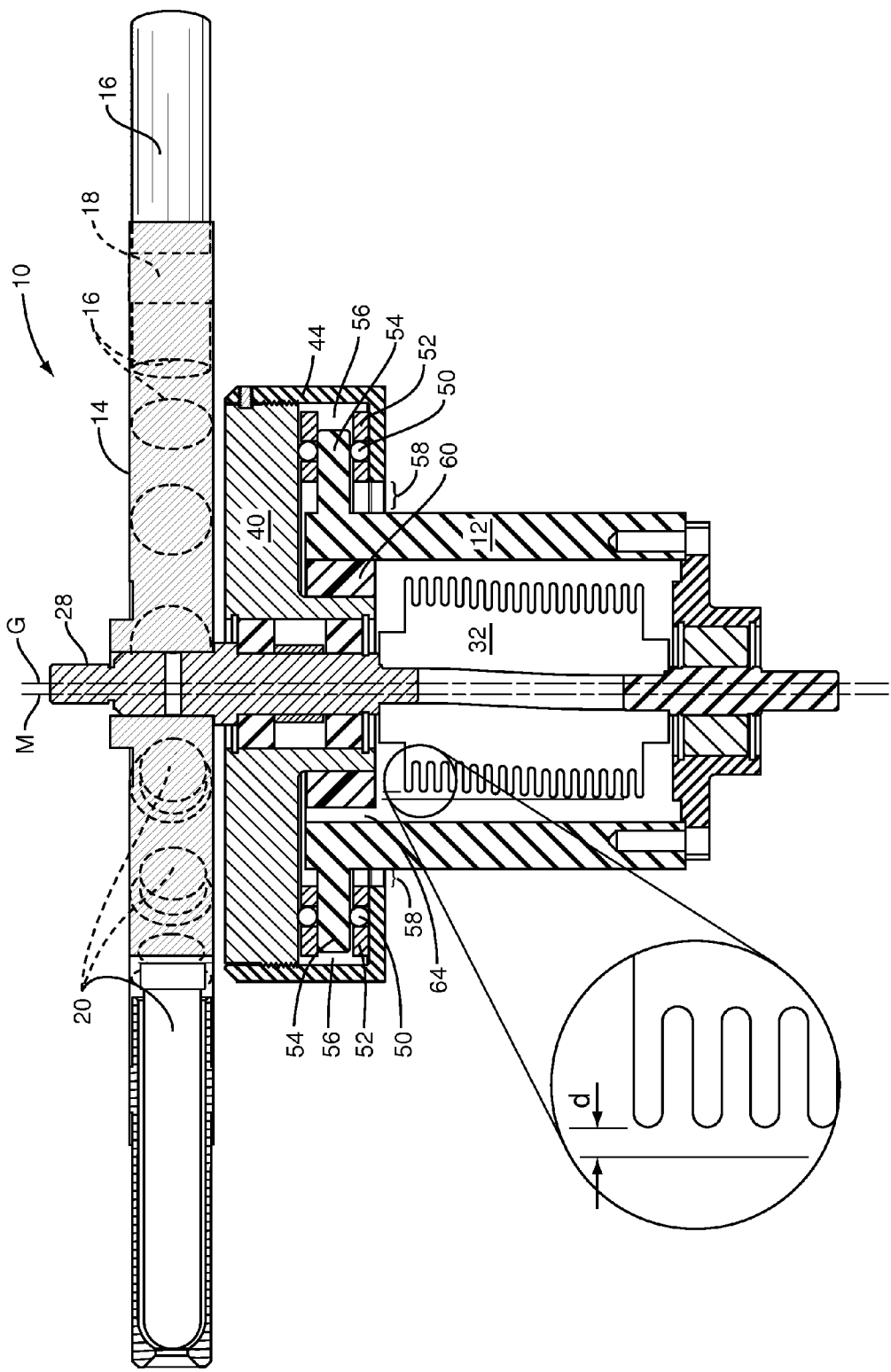
FIG. 7 illustrates an exemplary front cross-sectional view of FIG. 6 with the rotor spinning at slew speeds after a mass centering action has occurred and illustrates how the inertial coupling provides the inertial critical damping of the mass centering action of the rotor, according to an embodiment of the subject matter described herein.

FIG. 7 illustrates an exemplary front cross-sectional view of FIG. 6 with the rotor 14 spinning at slew speeds after a mass centering action has occurred and illustrates how the inertial coupling 40 provides the inertial critical damping of the mass centering action of the rotor 14. The buckets 16 are illustrated with dashed lines and rotated at the trunion mounts 18 to a horizontal plane during centrifugation. The sample tubes 20 are also illustrated with dashed lines. As described above in association with FIG. 6, the flexible bellows 32 has allowed the rotor 14 to shift its spin axis to its center of mass and has aligned this center of mass with the vertical axis/plane M, which also aligns with the center of geometry of the centrifuge 10. The center of geometry of the rotor 14, as represented by the vertical axis/plane G, is shown shifted to the right and aligned along the rotor shaft 28.

The flexible bellows 32 is shown flexed into an "S" shape toward the right within FIG. 7. The low-spring rate resistance of the flexible bellows 32 to lateral motion combined with the "soft coupling" of the rotor shaft 28 to the motor drive shaft 30 enables mass centering of the rotor 14. Additionally, the flexible bellows 32 provides enough resistance to movement to return the center of geometry of the rotor 14 (e.g., the vertical axis/plane G) to the center of mass of the centrifuge 10 when rotation stops (e.g., to the vertical axis/plane M). As such, the flexible bellows 32 provides angular torque fidelity to the rotor 14 without inhibiting lateral motion.

The lateral displacement of the flexible bellows 32 as it is flexed into the "S" shape may be measured by the distance between the vertical axis/plane M and the vertical axis/plane G. This distance is additionally illustrated within FIG. 7 at the top left of the flexible bellows 32 and in the magnified section to the left within FIG. 7. As can be seen from these additional illustrations, the flex of the flexible bellows 32 is measured as a distance "d," which may vary depending upon the magnitude of imbalance of the load within the centrifuge 10 and upon the material used for the circular elastomeric cushion 60.

The soft coupling provided by the flexible bellows 32 allows the rotor 14 to automatically adjust its spin axis from its center of geometry to its new center of mass (i.e., different from center of geometry) when torque is applied to "mass center" the unbalanced load presented by the seven sample tubes 20. The soft coupling of the rotor 14 provided by the flexible bellows 32 also transitions the rotor 14 through resonance at a relatively low energy, thereby enabling the mass centering action to occur.

As described above, a key aspect of the present invention is that the inertial coupling 40 critically damps the mass centering action without the need of real-time feedback, active damping devices, sensors, or solenoids that may be found in other rotor balancing systems. Additionally, by contributing its mass to the rotor 14 as a virtual mass without increasing the polar moment of inertia of the rotor 14, the inertial coupling 40 allows the lower resonance speed to be achieved without penalizing the acceleration/deceleration rate of the rotor 14 and may do so without penalizing the total rotational kinetic energy of the rotor 14.

As can be seen from FIG. 7, the circular elastomeric cushion 60 has moved to the right with the inertial coupling 40 and is in contact with the inner surface of the chassis 12. The space 64 on the left is larger as a result of the inertial coupling 40 moving to the right. Additionally, the space 56 on the left is smaller than the space 56 on the right, illustrating that the flange is closer to the left inner surface of the clamping collar 44. It should be noted that the circular elastomeric cushion 60 is compressible to a varying degree depending upon the material used for fabrication. As such, while FIG. 7 illustrates the circular elastomeric cushion 60 as it contacts the right inner surface of the chassis 12, it should be noted that the circular elastomeric cushion 60 may be compressed and lateral displacement of the inertial coupling 40 is limited by the physical stop provided by the circular flange 54 against the inside surface of the clamping collar 44.

Figure 2C:
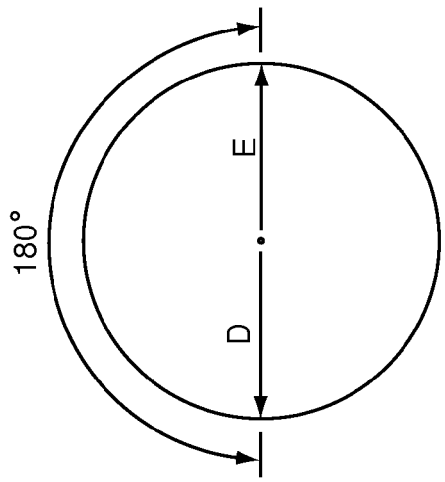
FIG. 2C illustrates exemplary force vectors associated with a centrifugation device at slew speeds.
Figure 2B:
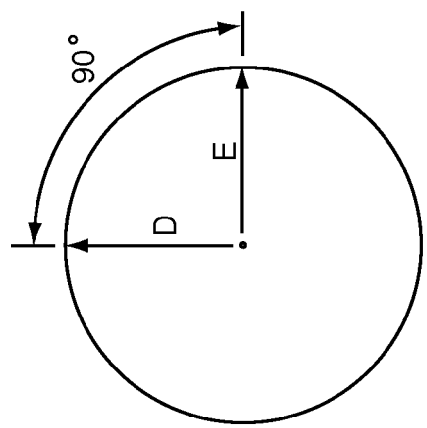
FIG. 2B illustrates exemplary force vectors associated with a centrifugation device at resonance.
Figure 2A:
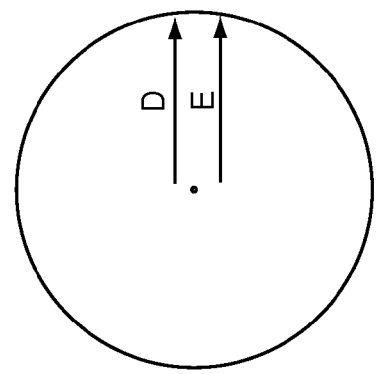
FIG. 2A illustrates exemplary force vectors associated with a centrifugation device as the rotor begins to rotate.

Exocentric forces may act against the inertial coupling 40. The inertial coupling 40 is free to move laterally via the bearings 50 within the bearing races 52. However, as described above in association with FIGS. 2A and 2B, the motion vector E direction quickly begins to lag behind exocentric force vectors D. Exocentric force vectors D can and do move the inertial coupling 40, but these forces are quickly re-applied in a new direction, thereby dynamically canceling previous force vectors D. In conjunction with the low spring rate of the flexible bellows 32, the inertial coupling 40 dramatically lowers effective resonance speed of the rotor 14 and rotational energy accumulated therein.

For a more theoretical understanding of the mass centering and critical inertial damping of the centrifuge 10, low rotational speeds cause exocentric forces to move the mass of the rotor 14 and the inertial coupling 40 physically in the direction of the force. As rotational speed increases, the motion direction begins to lag behind the force direction. The static center of gravity of the rotor 14 is offset from the geometric center of the centrifuge 10 as a consequence of exocentric imbalance. At high frequency ratios, the amount of resulting displacement of the rotor 14 approaches the amount of offset of the center of gravity. Since the phase angle is nearly 180 degrees (force opposite motion) at slew speeds, the center of gravity ends up at the geometric center of the centrifuge 10. This is mass centering and can only happen at high frequency ratios (e.g., slew speed greater than resonance).

Figure 8:
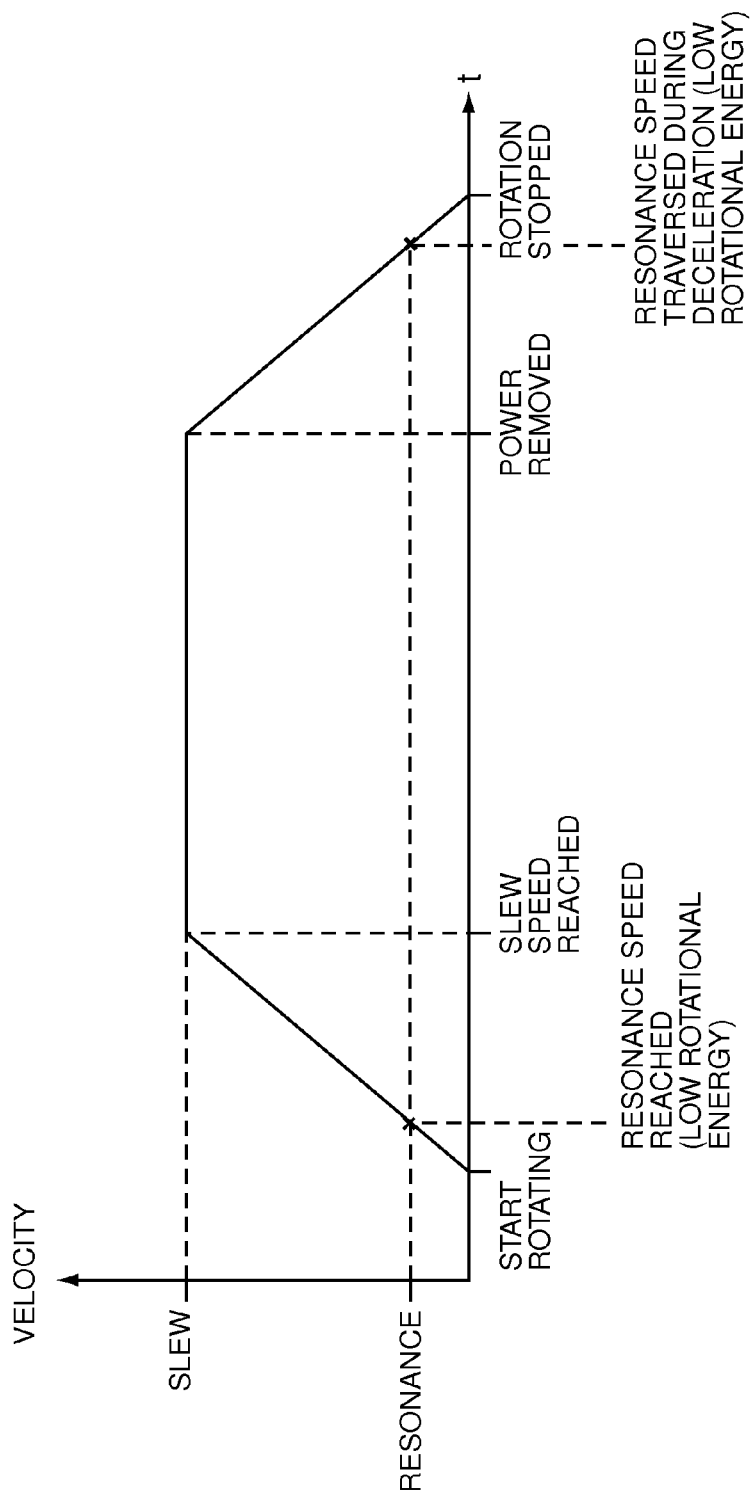
FIG. 8 illustrates an exemplary trapezoidal velocity-time plot for a centrifuge and represents the lower resonance speed provided, according to an embodiment of the subject matter described herein.

FIG. 8 illustrates a trapezoidal velocity-time plot for the centrifuge 10 and represents the lower resonance speed provided. As can be seen from FIG. 8 and as described above, the flexible bellows 32 and the inertial coupling 40 allow the rotor 14 to mass center in an inertial critically-damped fashion at a rotational speed that is considerably lower than for conventional centrifugation devices. As described above, no lateral frictional damping is provided and the lateral damping is provided in an inertial fashion by the inertial coupling 40. As an example of the difference in resonance speed between a conventional centrifugation device and the centrifuge 10, the centrifuge 10 may have a resonance speed of approximately 350 RPM, whereas a conventional centrifugation device may have a resonance speed of approximately 2680 RPM. This significant decrease in resonance speed also provides significantly lower rotational energy at resonance for the centrifuge 10 when compared to a conventional centrifugation device.

FIG. 9 illustrates an alternate embodiment of the centrifuge 10 which includes frictional rotational damping. The centrifuge 10 illustrated in FIG. 9 is shown without the rotor 14 attached for ease of illustration. As described above, the inertial coupling 40 may rotate at a rate of approximately 40-100 RPM as a result of friction within the bearing 42 and windage from the rotor 14 as the rotor 14 spins. Some rotation of the inertial coupling 40 is useful in addition to the lateral movement during mass centering to allow the ball bearings 50 to rotate within the ball bearing races 52. Ball bearings need to rotate to distribute loads evenly over their surfaces and to prevent the development of flat spots. Additionally, allowing the ball bearings 50 to rotate distributes lubricant evenly over their surfaces and their mating flat surface contact points within the ball bearing races 52.

Because the rotation of the inertial coupling 40 is induced over time due to friction in the ball bearings 42 and windage from the rotor 14, the effects of the rotation of the inertial coupling 40 are not experienced during acceleration. However, this is not true during deceleration. As such, the rotation of the inertial coupling 40 may induce additional wobble as resonance is traversed during the deceleration phase of the centrifuge 10. This wobble results from the rotational energy of the inertial coupling 40 which imparts a polar moment of inertia to the rotor 14.

As such, the exemplary embodiment illustrated in FIG. 9 provides rotational frictional damping for the inertial coupling 40. A frictional damping rod 70 is illustrated within a cavity 72 of the chassis 12. A spring 74, which is compressed within the cavity 72 below the rod 70, applies force to the rod 70 sufficient to limit rotation of the inertial coupling 40. However, as described above, rotation of the inertial coupling 40 resulting from the friction in the ball bearings 42 and windage from the rotor 14 is not prevented, but is reduced by the rotational frictional damping of the rod 70.

Though only one rod 70 is depicted within FIG. 9, it should be noted that any number of rods may be placed around the perimeter of the chassis 12 depending upon the material of the rod 70 and the force applied to it by the spring 74. For example, three rods 70 may be placed at 120 degrees relative to each other around the perimeter of the chassis 12 to provide three points of contact for the rotational frictional damping.

The material used to construct the rod 70 may be a material such as polytetrafluoroethylene (PTFE) or olefin. Alternatively, higher friction materials, such as polyurethane, may be used for tuning purposes where higher frictional damping may be desired. The rods 70 may also be made of graphite or a high-density wool felt. When high-density wool felt is used, oil, such as a silicone oil, may be placed within the cavity 72 of the chassis 12. A silicone oil, such as 200 centipoise oil, may be used. The high-density wool felt may act as a wick to draw the lubricant onto the surface of the inertial coupling 40. The use of high-density wool felt may improve the usable life and reliability of the rods 70. Polyetheretherketone (PEEK) is another alternative material that may be used for the rods 70. PEEK is a low friction/high temperature thermo plastic. Reliability of the centrifuge 10 may be improved by decreasing excessive rotation of the inertial coupling 40 by use of the rods 70.

Figure 10:
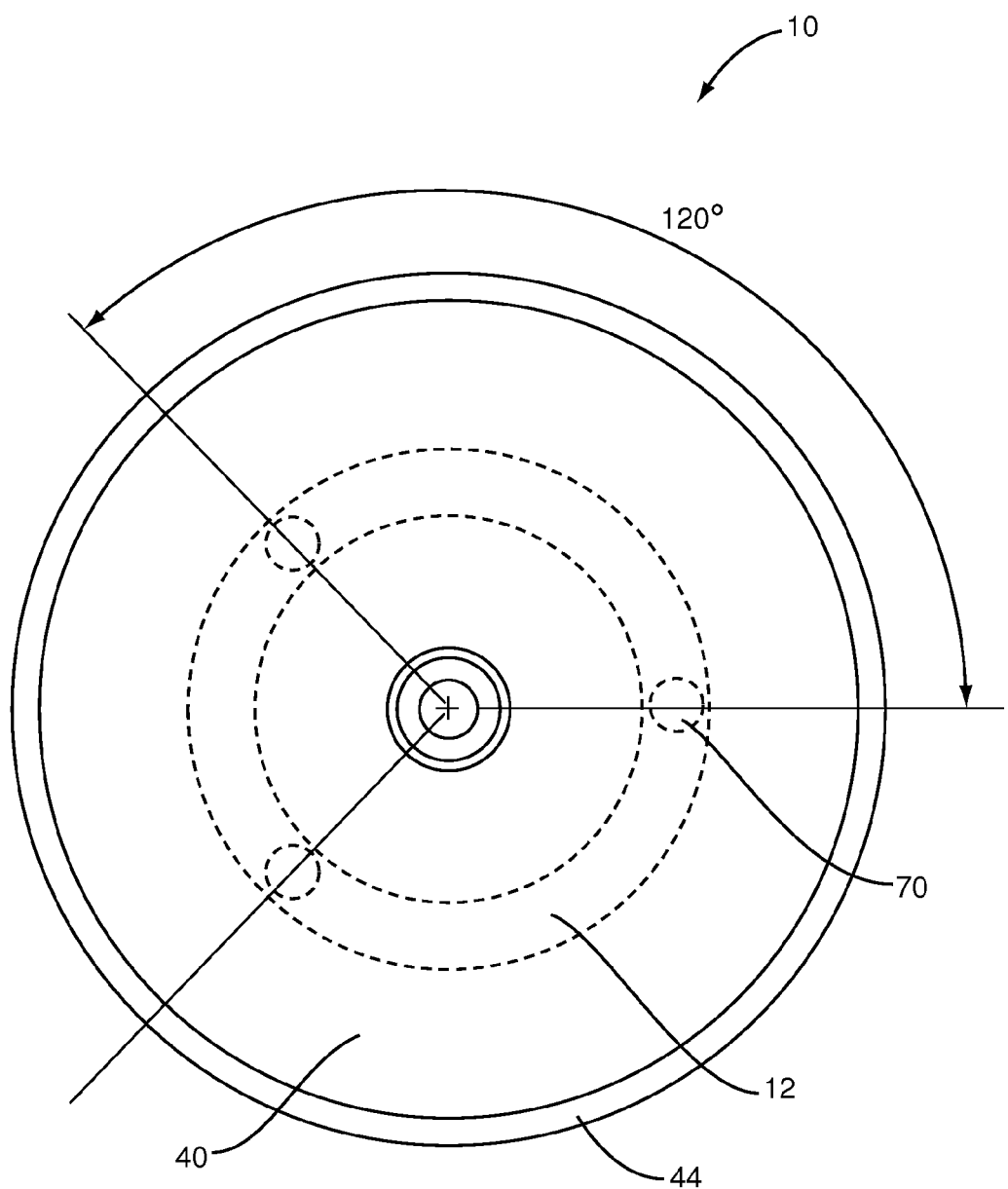
FIG. 10 illustrates an exemplary top view of a centrifuge without a rotor attached and shows three rods placed at 120 degrees relative to one another around the periphery of the chassis of the centrifuge to provide rotational frictional damping, according to an embodiment of the subject matter described herein.

FIG. 10 illustrates a top view of the centrifuge 10 without the rotor 14 attached and shows three rods 70 placed at 120 degrees relative to one another around the periphery of the chassis 12 of the centrifuge 10 to provide rotational frictional damping. The inertial coupling 40 and the clamping collar 44 are illustrated with solid lines. The chassis 12 and the three rods 70 placed at 120 degrees relative to one another are illustrated with dashed lines. As described above, any combination of rods 70 may be used depending upon the materials and design preferences for the rotational frictional damping thereby provided.

Those skilled in the art will recognize improvements and modifications to the preferred embodiments of the present invention. All such improvements and modifications are considered within the scope of the concepts disclosed herein and the claims that follow.

What is claimed is:

1. An apparatus for mass centering an unbalanced load, comprising:
   a support chassis having a peripheral flange;
   a rotor operatively coupled to the support chassis;
   a rotor drive shaft adapted to mount the rotor and rotate the rotor;
   a lower drive shaft adapted to connect to a source of rotation;
   a flexible coupling attaching the rotor drive shaft to the lower drive shaft, wherein the flexible coupling is adapted to transfer a rotational force applied by the source of rotation to the rotor while permitting relative lateral motion between the rotor drive shaft and the lower drive shaft;
   an independent damping bearing comprising a plurality of ball bearings located between the rotor and the peripheral flange of the support chassis; and
   the damping bearing adapted for traveling laterally relative to and independent of the support chassis and rotor during inertial mass centering of the rotor, and providing lateral frictional resistance to the relative lateral motion between the rotor drive shaft and the lower drive shaft.

2. The apparatus of claim 1, wherein the flexible coupling further comprises a flexible bellows adapted to flex sufficiently to permit a rotational center of mass of the rotor in combination with the unbalanced load to vertically align with a center of geometry of the chassis.

3. The apparatus of claim 1, wherein the flexible coupling further comprises a low spring-rate flexible bellows adapted to provide sufficient resistance to the relative lateral motion between the rotor drive shaft and the lower drive shaft to return a center of geometry of the rotor to a center of geometry of the chassis when the rotor stops turning.

4. The apparatus of claim 1, and comprising an inertial coupling coupled to the rotor drive shaft and adapted to provide inertial resistance to the relative lateral motion between the rotor drive shaft and the lower drive shaft.

5. The apparatus of claim 4, wherein the inertial coupling comprises a mass greater than a mass of the rotor.

6. The apparatus of claim 4, wherein the inertial coupling comprises a mass smaller than a mass of the rotor.

7. The apparatus of claim 4, further comprising a second bearing that couples the inertial coupling to the rotor drive shaft, wherein the bearing is adapted to allow the rotor drive shaft to turn at a rate of the lower drive shaft without requiring the inertial coupling to turn at the rate of the lower drive shaft.

8. The apparatus of claim 7, further comprising at least one rotational frictional damping rod adapted to inhibit rotation of the inertial coupling resulting from at least one of friction between the second bearing and the inertial coupling, windage resulting from spinning of the rotor, and harmonic drive.

9. The apparatus of claim 8, wherein the chassis further comprises at least one cavity and the at least one rotational frictional damping rod is located within the at least one cavity of the chassis.

10. The apparatus of claim 9, further comprising at least one spring compressed within the at least one cavity of the chassis below the at least one rotational frictional damping rod, wherein the at least one spring is adapted to compress the at least one rotational frictional damping rod against a lower surface of the inertial coupling to inhibit rotation of the inertial coupling.

11. The apparatus of claim 8, wherein the at least one rotational frictional damping rod comprises at least one of poly tetra fluoro ethylene (PTFE), olefin, polyurethane, high density wool felt, and Polyetheretherketone (PEEK).

12. The apparatus of claim 8, wherein the at least one rotational frictional damping rod comprises high-density wool felt and is adapted to wick oil onto a lower surface of the inertial coupling to inhibit rotation of the inertial coupling.

13. The apparatus of claim 12, wherein the oil comprises silicone oil.

14. The apparatus of claim 4, and further comprising a clamping collar adapted to couple the inertial coupling to the chassis and to permit the relative lateral motion between the rotor drive shaft and the lower drive shaft.

15. The apparatus of claim 14, and comprising first and second independent damping bearing races positioned along a lower surface of the inertial coupling and an upper surface of the clamping collar and wherein the clamping collar is further adapted to secure bearings within the bearing races positioned along the lower surface of the inertial coupling and the upper surface of the clamping collar against upper and lower surfaces of the chassis flange, respectively.

16. The apparatus of claim 15, wherein the inertial coupling further comprises a threaded region at an outer edge of the inertial coupling and the clamping collar further comprises a threaded region at an inner edge, wherein the clamping collar is further adapted to be threaded onto the threaded region at the outer edge of the inertial coupling until retention of the damping bearings is achieved.

17. The apparatus of claim 16, further comprising at least one set screw adapted to secure the clamping collar to the inertial coupling and wherein the clamping collar is further adapted to maintain retention of the damping bearings using the at least one set screw.

18. The apparatus of claim 4, further comprising a cushion attached to a circular collar of the inertial coupling adapted to contact an inner surface of the chassis during the mass centering of the unbalanced load within the rotor and to absorb energy without causing the inertial coupling to rebound from the inner surface of the chassis.

19. The apparatus of claim 18, wherein the cushion comprises a low durometer open or closed cell foam of a monomer.

20. The apparatus of claim 19, wherein the low durometer open or closed cell foam of the monomer includes polyurethane.

21. The apparatus of claim 4, further comprising a cushion attached to an inner surface of the chassis adapted to contact an outer surface of a circular collar of the inertial coupling during the mass centering of the unbalanced load within the rotor and to absorb energy without causing the inertial coupling to rebound from the inner surface of the chassis.

22. A method for mass centering an unbalanced load, comprising:
   operatively coupling a rotor to a support chassis having a peripheral flange;
   operatively coupling the rotor to a rotor drive shaft;
   operatively coupling the rotor drive shaft to a lower drive shaft via a flexible coupling, wherein the flexible coupling is adapted to transfer a rotational force from the lower drive shaft to the rotor coupled to the rotor drive shaft;
   locating an independent damping bearing between the rotor and the peripheral flange of the support chassis, the damping bearing comprising a plurality of ball bearings;
   permitting the damping bearing to travel laterally relative to and independent of the support chassis and rotor during inertial mass centering of the rotor; and
   permitting relative lateral motion between the rotor drive shaft and the lower drive shaft via the flexible coupling.

23. The method of claim 22, further comprising coupling an inertial coupling to the rotor drive shaft, wherein the inertial coupling is adapted to provide inertial resistance to the relative lateral motion between the rotor drive shaft and the lower drive shaft, and further providing the inertial resistance to the relative lateral motion between the rotor drive shaft and the lower drive shaft based upon mass of the inertial coupling.

24. The method of claim 23, wherein the inertial resistance provided by the mass of the inertial coupling further comprises critically-damped inertial resistance.

25. The method of claim 23, further comprising placing a vertical center of mass of the inertial coupling in close proximity to a location on the rotor drive shaft where the rotor drive shaft is adapted to mount the rotor to limit cantilevered moments between the rotor and the inertial coupling.

26. The method of claim 23, further comprising allowing the inertial coupling to turn as an incidence of at least one of friction between a second bearing which couples the inertial coupling to the rotor drive shaft, windage resulting from spinning of the rotor, and harmonic drive.

27. The method of claim 23, further comprising limiting axial motion of the inertial coupling relative to the rotor during rotation of the rotor and during mass centering of the rotor in the presence of the unbalanced load within the rotor.

28. The method of claim 22, further comprising providing resistance to the relative lateral motion between the rotor drive shaft and the lower drive shaft via the flexible coupling sufficient to return a geometric center of the rotor drive shaft to a geometric center of the lower drive shaft when the rotor stops turning.

* * * * *